United States Patent [19]
Eshraghian et al.

[11] 4,379,280
[45] * Apr. 5, 1983

[54] VEHICLE DETECTION SYSTEMS

[75] Inventors: Kamran Eshraghian, Hectorville South; Robert E. Bogner, College Park South, both of Australia

[73] Assignee: U.S. Philips Corporation, New York, N.Y.

[*] Notice: The portion of the term of this patent subsequent to Nov. 18, 1997, has been disclaimed.

[21] Appl. No.: 953,328

[22] Filed: Oct. 20, 1978

[30] Foreign Application Priority Data

Nov. 9, 1977 [AU] Australia .................. PD2355

[51] Int. Cl.³ .................. G08G 1/01; G06G 7/76
[52] U.S. Cl. .................. 340/38 L; 340/62; 364/436; 364/438
[58] Field of Search .................. 340/38 R, 38 L, 62; 324/160, 173, 177, 179; 343/8; 364/438, 565, 436, 437

[56] References Cited

U.S. PATENT DOCUMENTS 3,911,389 10/1975 Mills .................. 340/38 L
4,234,923 11/1980 Eshraghian et al. .................. 340/38 L

FOREIGN PATENT DOCUMENTS 2819565 11/1978 Fed. Rep. of Germany .... 340/38 L
562486 5/1974 Switzerland .................. 340/38 L
1245360 9/1971 United Kingdom .................. 340/38 L
1272224 4/1972 United Kingdom .................. 340/38 L Primary Examiner—James J. Groody
Attorney, Agent, or Firm—Robert J. Kraus

[57] ABSTRACT

The detector system comprises a CW transmitter which is coupled to a receiver in a manner such that an approach of a vehicle produces an amplitude increasing excursion in the envelope of the received signal. At the receiver, the envelope of the received signal is sampled to derive the quantity $at/V_p$ which is proportional to the speed of the vehicle, where $V_p$ is equivalent to the envelope voltage of the received signal at an instant $I_p$ during the leading edge portion of each excursion at which the first-occuring marked decrease of the slope of the leading edge occurs less the envelope voltage prior to the excursion and $at$ is an electrical quantity proportional to the maximum slope of the leading edge of each excursion during the leading edge portion preceding the instant $I_p$.

5 Claims, 9 Drawing Figures

VEHICLE DETECTION SYSTEMS

BACKGROUND OF THE INVENTION

The present invention relates to vehicle detection systems wherein a transmitter supplying a continuous wave signal is coupled to a receiver via sensing means so that the approach of a sensed vehicle produces an excursion increasing the amplitude of the envelope of the received signal.

Vehicle detection systems of the kind to which the invention relates are known.

In one known system, the sensing means is located beneath the road surface and comprises a transmitting coil forming part of the transmitter which is inductively coupled to a receiving coil forming part of the receiver. As a vehicle enters the zone of influence, the inductive coupling between the transmitting coil and the receiving coil is changed and causes a corresponding change in the level of the received signal.

SUMMARY OF THE INVENTION

An object of the present invention is to provide a system for detecting the speed of a sensed vehicle.

According to the invention, the vehicle speed detection system comprises a transmitter supplying a continuous wave signal which is coupled to a receiver via sensing means so that the approach of each sensed vehicle produces an amplitude increasing excursion of the envelope of the received signal. At the receiver, in response to each disturbance or excursion of the envelope caused by an approaching vehicle, electrical quantities substantially equivalent to $\alpha t$ and $Vp$ are respectively derived from the received signal, fron which quantities a further quantity substantially proportional to the speed of each sensed vehicle is formed equivalent to the expression $\alpha t/Vp$. In this expression $Vp$ is equivalent to the envelope voltage of the received signal at an instant $Ip$ during the leading edge portion of each said excursion at which the first-occurring zero slope or marked decrease of slope of the leading edge occurs less the envelope voltage prior to the excursion. For simplicity this location will be called the first peak. $\alpha t$ is an electrical quantity proportional to the maximum slope of the leading edge of each said excursion during the leading edge portion preceding the instant $Ip$.

The electrical quantity $\alpha t$ corresponds to the difference between the envelope voltage $V_1$ of the received signal at an instant $I_1$ when the slope of the said leading edge is at a maximum preceding the instant $Ip$ and the envelope voltage $V_2$ at an instant $I_2$ occurring at a fixed time after the instant $I_1$ and preceding the instant $Ip$.

Thus, to obtain an electrical quantity equivalent to $\alpha t/Vp$, the envelope voltage of the received signal may be sampled at the instants $Ip$, $I_1$ and $I_2$ during the leading edge portion of each excursion to obtain the voltages $Vp$, $V_1$ and $V_2$. Instants $Ip$, $I_1$ and $I_2$ are determined by the characteristics of a control signal corresponding to the differential or the first time derivative of the envelope of the received signal.

Accordingly, in one form, the system comprises sampling means for deriving a sample voltage corresponding to the voltage $V_1$ of each excursion by sampling the envelope voltage of the received signal under the control of a peak detection means fed by a differentiating means forming a control signal corresponding with the differential or the first time derivative of the envelope voltage. The peak detection means detects control signal peaks to initiate sampling at the instant $I_1$ during the leading edge portion of each excursion. The system further includes sampling means for deriving sample voltages corresponding to the voltage $Vp$ of each excursion by sampling the envelope voltage of the received signal under the control of a zero crossover detection means fed by a differentiating means forming a control signal corresponding with the differential of the envelope of the received signal. The zero crossover detection means detects zero crossover points of the control signal to initiate sampling at the instant $Ip$ of each positive going excursion.

In another form, the system comprises a sampling means for deriving sample voltages corresponding to the voltages $V_1$ and $Vp$ of each positive going excursion by sampling the envelope voltage of the received signal under the control of a zero crossover detection means fed by a double differentiating means forming a control signal corresponding to the differential of the differential or the second time derivative of the envelope of the received signal. The zero crossover detection means detects zero crossover point of the control signal to initiate sampling at the respective instants $I_1$ and $Ip$ of each positive going excursion.

The electrical quantity $\alpha t$ also corresponds to the maximum amplitude of a derived signal representing the differential of the received signal envelope attained during the leading edge portion of each said excursion. Thus, in an alternative form of the invention an electrical quantity equivalent to $\alpha t/Vp$ is obtained by sampling the derived voltage at the instant $I_1$ to obtain a voltage representing $\alpha t$ and sampling the envelope of the received signal at the instant $Ip$ to obtain a voltage representing $Vp$.

As discussed in the foregoing, sampling at one or more of the instants $Vp$ and $I_1$ may be determined by the characteristics of a control signal corresponding to the first time derivative of the envelope of the received signal or by the characteristics of a control signal corresponding with the second time derivative of the envelope of the received signal. In a further alternative sampling at one or more of the instants $Ip$ and $I_1$ is determined jointly by a control signal corresponding to the second time derivative of the envelope of the received signal and by a control signal corresponding to the third time derivative of the envelope of the received signal.

Of course, sampling at the instant $I_2$ is fixed in relation to the instant $I_1$ and may be readily achieved.

In vehicle detection systems of the kind to which the invention relates, the aforementioned excursion of the envelope of the received signal may be regarded as an amplitude modulation of the continuous wave signal, the shape of the excursion being determined by the characteristics of the particular sensed vehicle. For convenience, the shape of the excursion of the envelope so formed may be referred to as the "signature waveform" of the vehicle in question.

The present invention is based upon the observation that the initial portion of the "signature waveform" is predictable within narrow limits for all vehicles whereas subsequent to the initial portion the signature waveform is unpredictable, its shape being dictated by the characteristics of the individual vehicle. The invention is also based upon the further observation that the voltage reached ($Vp$) as the "signature waveform" levels off at the end of its initial portion when divided by the maximum slope of the initial portion is relatively constant despite the characteristics of the sensed vehicle.

BRIEF DESCRIPTION OF THE DRAWING

The invention will now be further described with reference to the accompanying figures in which.

DESCRIPTION OF THE PREFERRED EMBODIMENTS

Figure 1:
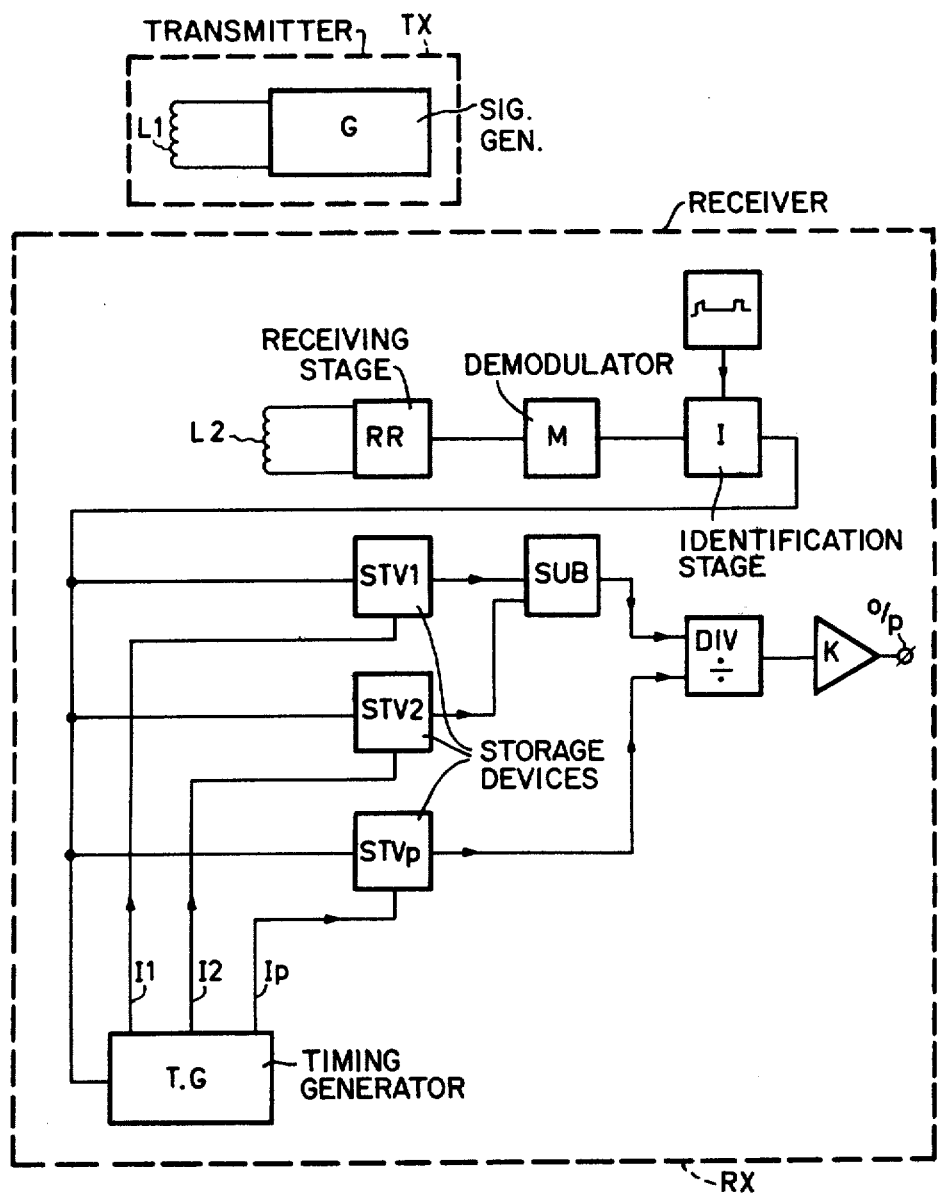
FIG. 1 is a block schematic diagram of a system according to the invention.

The system of FIG. 1 comprises a transmitting apparatus denoted by the letters TX and a receiving apparatus denoted by the letters RX. The transmitter coil L1 of the transmitting apparatus TX and the receiving coil L2 of the receiving apparatus RX are each located just beneath the surface of a roadway or traffic lane and spaced apart from each other with their respective coil axes substantially in alignment and orthoganol to the roadway or traffic lane so that the inductive coupling between the coil L1 and the coil L2 is influenced by the presence of a vehicle in the roadway or lane.

The generator G of the transmitter TX produces in known manner a continuous wave signal of constant frequency (e.g. 100 kHz) which is fed to the coil L1 and radiated thereby.

Signals received by the receiving coil L2 are fed to the input of the receiving stage RR which selects and amplifies in a known manner incoming signals with a predetermined bandwidth including the frequency of the signal radiated by the coil L1. Thus, the output signal of the stage RR is a continuous wave signal which is amplitude modulated whenever a vehicle approaches and/or passes over the sensing means formed by the coils L1 and L2.

The stage M, following the receiving stage RR, processes the received signal by demodulation or otherwise so that a signal is produced at its output corresponding to the envelope of the received signal.

The stage I, following the stage M, further processes the output signal of the stage M by identifying the occurrence of a positive going excursion of the envelope of the received signal due to the approach of a vehicle as distinct from a positive going excursion due to other causes such as changes in the environmental conditions. Such identification systems are described in the applicant's co-pending Australian Patent Application No. PD0001. A representative one of these identification systems is described in detail near the end of the description of the preferred embodiments. Stage I identifies positive going excursions of the envelope of the received signal having a sharply rising leading edge portion produced by the approach of a vehicle and without such recognition produces no output but upon such recognition produces an output signal coinciding with the difference between a stored sample voltage and the envelope voltage, the stored sample voltage being a voltage corresponding to that of the envelope voltage itself at an initial portion of the sharply rising leading edge.

Figure 2:
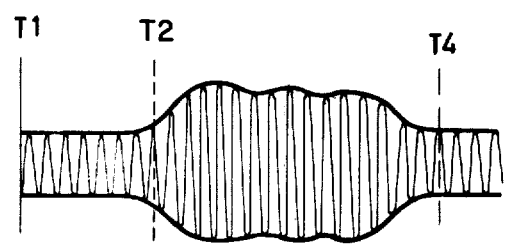
FIGS. 2, 3a and 3b and 4a to 4f illustrate diagrammatically waveforms produced at various parts of the system of FIG. 1.

FIG. 2 is a graphical illustration of a signal produced at the output of the stage RR. Between the instants T1 and T2 there is no vehicle within the zone of influence and between the instants T2 and T4 a vehicle is approaching and passing over the sensing means formed by the coils L1 and L2.

Figure 3:
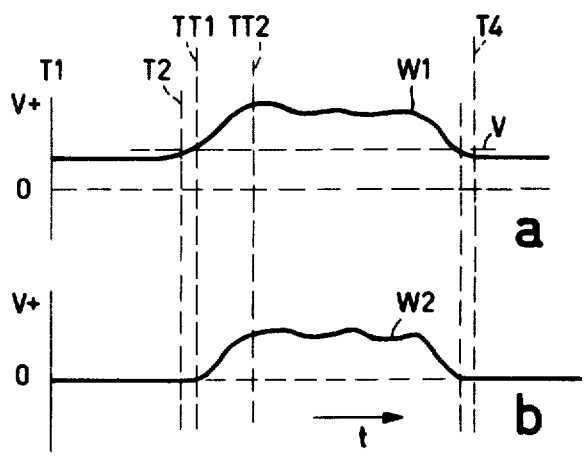

FIG. 3a is a graphical illustration of the resultant signal waveform W1 produced at the output of the stage M, between the instants T2 and T4 there being a positive going excursion due to the passage of a vehicle.

FIG. 3b is a graphical illustration of the resultant signal produced at the output of the stage I. The waveform W2 illustrated in FIG. 3b is the difference between the waveform W1 of FIG. 3a and the stored voltage indicated by the dotted line V of FIG. 3a.

Figure 4:
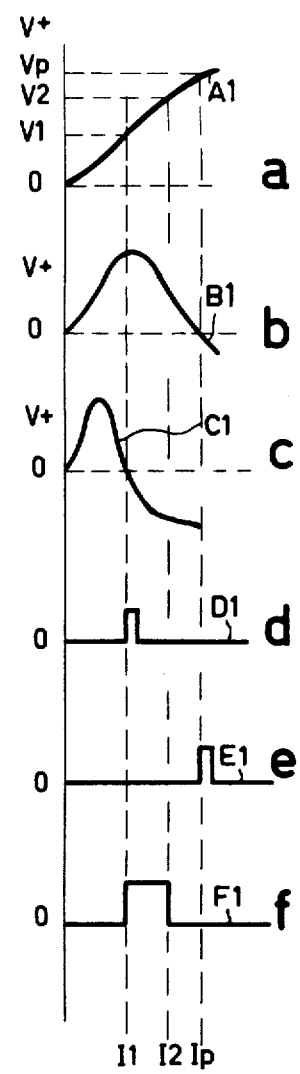

FIG. 4a shows graphically by means of the voltage waveform A1 the change in the level of the envelope of the received signal approximately between the instants TT1 and TT2 i.e. during the leading edge portion of the signal of FIG. 3a.

FIG. 4b shows graphically by means of the waveform B1 a voltage representing the differential of the voltage of the waveform A1.

FIG. 4c shows graphically by means of the waveform C1 a voltage representing the differential of the voltage of the waveform B1.

FIG. 4d shows graphically by means of the waveform D1 a timing pulse, the timing of which may be controlled by the voltage waveform B1 or which may alternatively be controlled by the voltage waveform C1.

FIG. 4e shows graphically by means of the waveform E1 another timing pulse, the timing of which may be controlled by the voltage waveform of B1 or which may alternatively be controlled by the voltage waveform C1.

FIG. 4f shows graphically by means of the waveform F1 a pulse of fixed duration, the timing of which is controlled by the pulse of waveform D1.

Referring once more to FIG. 1, the output signal of the stage I is, by way of example, as indicated by the voltage waveform W2 of FIG. 3b. The leading edge portion of the waveform W2 between the instants TT1 and TT2 thus coincides with the waveform of FIG. 4a. The output of the stage I is fed to the stages STV1, STV2 and STVP and also to the timing generator TG. The stages STV1, STV2, and STVP will, upon command by timing pulses, store at their respective outputs in known manner the voltage present at their respective inputs at the occurrence of the respective timing pulses until occurrence of the next timing pulse applied thereto.

The timing generator TG, under the control of the waveform W2 produces timing pulses coinciding with the instants I1, I2 and IP and the timing pulses are applied respectively to the stages STV1, STV2 and STVP to command storage at those instants. Thus, the stage STV1 stores the voltage V1, the stage STV2 stores the voltage V2 and the store STVP stores the voltage VP in response to passage of a vehicle. The outputs of the stages STV1 and STV2 are applied to the subtractor stage SUB, producing at its output a voltage equal to V2−V1.

The output of the subtractor stage SUB is fed to the dividing stage DIV to which the voltage VP from the store STVP is also fed. The divider DIV operates in known manner to divide the voltage V2−V1 by the voltage VP. Accordingly, the output voltage of the dividing stage DIV is substantially equivalent to V2−V1/Vp, this voltage being substantially proportional to the speed of the sensed vehicle from which the waveform W2 has resulted.

The output of the divider stage DIV is fed via an amplifier having an amplification equivalent to a constant K thus producing at the output terminal OP a voltage also proportional to the speed of the said sensed vehicle and in terms of kilometers per hour.

The timing pulse generator TG may take any one of several different forms. In one form the waveform A1 is differentiated to produce the waveform B1 and by peak detection the instant at which the waveform B1 reaches its maximum is determined for producing a timing pulse coinciding with the instant I1 as indicated by the waveform D1. In addition, by means of known zero-crossover detection techniques, the instant of zero-crossover of the waveform B1 is determined for producing a timing pulse coinciding with the instant IP as indicated by the waveform E1.

In another form, the waveform A1 is differentiated to produce the waveform B1 and the waveform B1 is also differentiated to produce the waveform C1. By zero-crossover detector techniques the instants I1 and IP are determined to produce timing pulses as indicated by the respective waveforms D1 and E1.

A monostable multivibrator or equivalent device may be employed to determine the instant I2 and produce a timing pulse at the instant I2 at a fixed instant following I1. The trailing edge of the pulse of the waveform F1 of FIG. 4f may be employed for this purpose.

Figure 5:
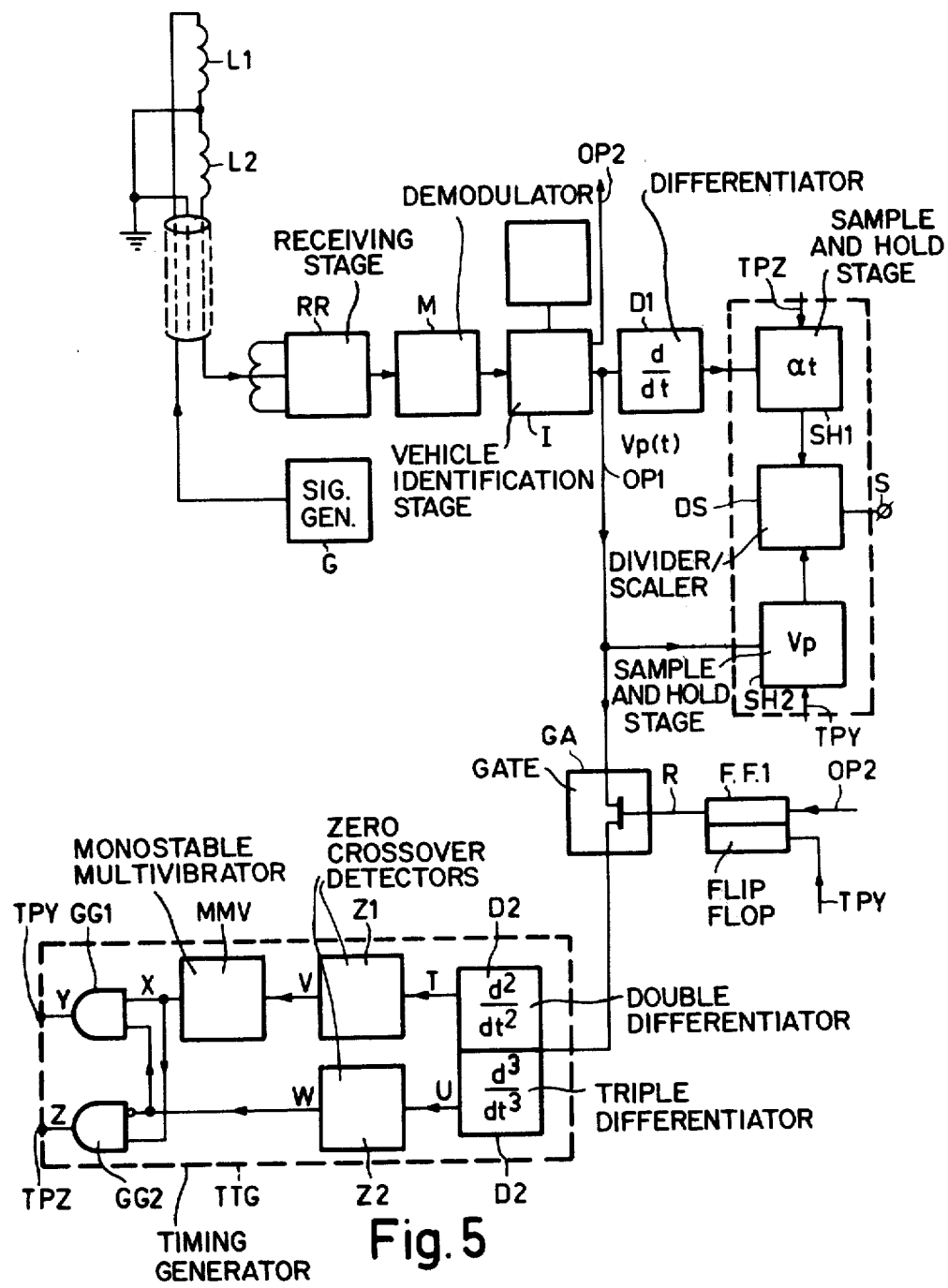
FIG. 5 is a block schematic diagram of another system according to the invention.

In FIG. 5 similar parts to those of the system of FIG. 1 are denoted by similar numerals or letters. In the system of FIG. 5, output signals produced at the output OPI of the stage I are fed to the differentiator D1, to the sample and hold stage SH2 and also, via the gate GA to the double differentiation stage D2 and the triple differentiation stage D3. The flip-flop FF1 controls the gate GA, one state of the flip-flop FF1 enabling the gate GA and the other state closing the gate GA. Pulses produced at the output OP2 of the stage I are applied to the flip-flop FF1 opening the gate GA whenever the approach of a vehicle is sensed.

Figure 6:
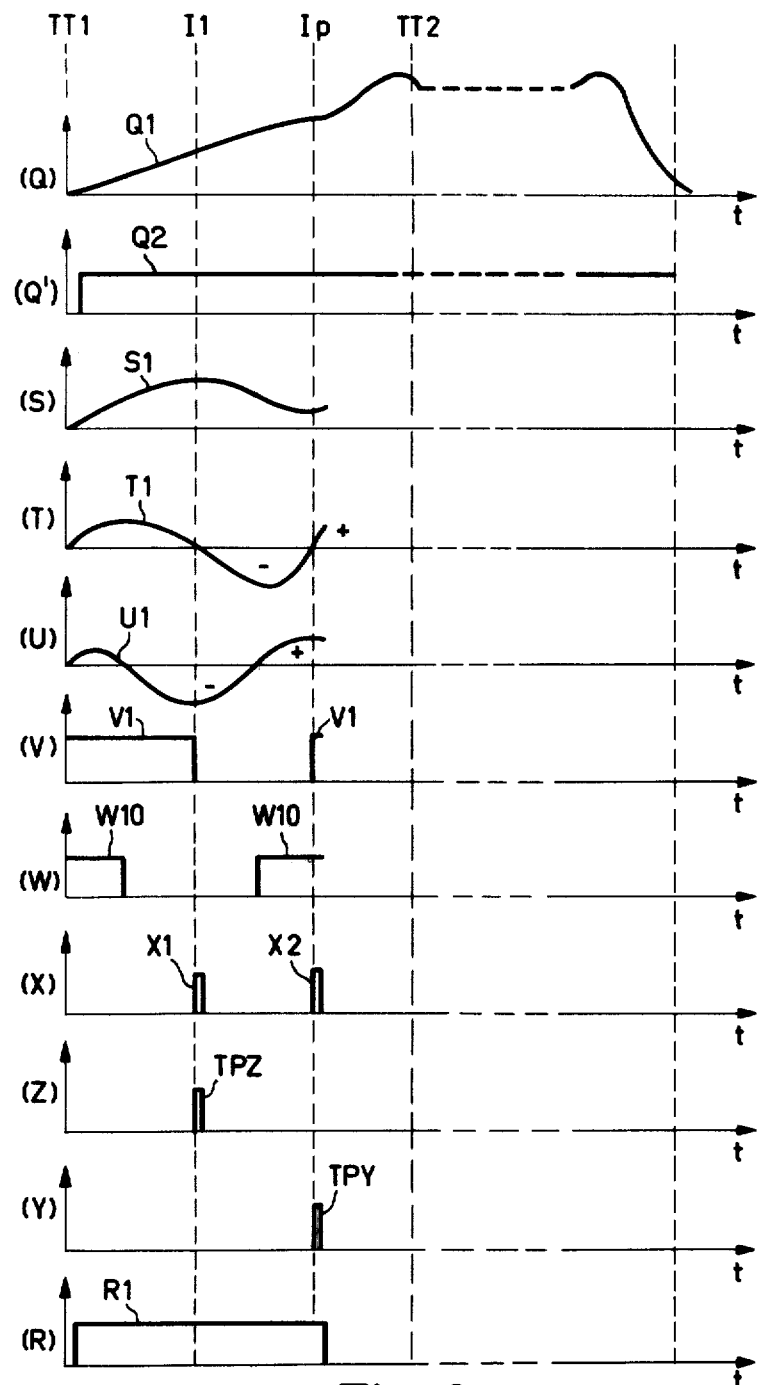
FIGS. 6Q to 6R illustrates diagrammatically waveforms produced at various parts of the system of FIG. 5.

By way of example, it will be assumed that in response to a second vehicle a signal is received in the system of FIG. 5 which is generally similar to that depicted in FIG. 2 of the accompanying drawings and that at the output OP1 of the stage I an output signal generally similar to the signature waveform W2 of FIG. 3b is produced so that consequently between the instants TT1 and TT2 the waveform Q1 of FIG. 6Q is produced at the output OP1. Simultaneously, a pulse Q2 is depicted in FIG. 6Q' and having a length related to that of the sensed vehicle is produced at the output OP2 of the state I by means of the techniques described in the applicant's aforementioned co-pending Australian Patent application No. PD0001.

It is to be noted that the signature waveform Q1 illustrated in FIG. 6Q as occurring between the instants TT1 and TT2 differs slightly from that of the signature waveform illustrated in FIG. 4a in that there is an inflection in the leading edge of the waveform Q1 whereas no such inflection is illustrated in the waveform of FIG. 2a. The presence or otherwise of such an inflection is, of course, entirely dictated by the characteristics of the sensed vehicle. When such an inflection represents a marked decrease of slope of the leading edge of the signature waveform, the system of FIG. 5 will treat this as a "first peak" and will respond accordingly and for that reason an inflection is illustrated in this instance.

The timing generator TTG produces timing pulses to control sampling at the instants I1 and Ip. Within the timing generator TTG, the double differentiating stage D2 twice differentiates the waveform Q1 producing an output of the stage D2 as is illustrated by the waveform T1 of FIG. 6T which is fed to the zero-crossing detector Z1 which produces in response thereto the rectangular wave V1 of FIG. 6V. The output of the zero-crossing detector Z1 is fed to the monostable multivibrator MMV which produces a pulse of short duration in response to any change of the state of the wave V1, such pulses are denoted as X1 and X2 in FIG. 6X which shows the output of the monostable multivibrator MMV between the instants TT1 and TT2. Simultaneously, the triple differentiation stage D3 thrice differentiates the waveform Q1 producing an output of the stage D3 as is illustrated by the waveform U1 of FIG. 6U which is fed to the zero crossing detector Z2 which produces, in response thereto, the rectangular wave W10 of FIG. 6W.

The output of the monostable multivibrator MMV is applied to one input of the AND gate GG1 to the other input of which the output of the zero-crossing detector Z2 is applied. Accordingly, a timing pulse TTY is produced at the output of the gate GG1 at an instant Ip (i.e. at the first occurring marked decrease of slope of the leading edge of the signature waveform Q1) in response to a sensed vehicle as illustrated in FIG. 6Y.

The output of the multivibrator MMV is also fed to one input of the and gate GG2 to the other input of which an inverted version of the output of the zero-crossing detector Z2 is supplied. Accordingly, in response to each sensed vehicle, a timing pulse TPZ is produced at the instant I1 (i.e. at the time of maximum slope of the leading edge of the signature waveform Q1, as illustrated in FIG. 6Z). The output of the gate GG1 is fed to the flip-flop FF1 turning over the flip-flop FF1 thereby closing the gate GA until the next sensed vehicle. The output of the flip-flop FF1 is illustrated by the waveform R1 in FIG. 6R.

As previously mentioned, signature waveforms of sensed vehicles produced at the output OP1 of the identification stage I are fed to the differentiator D1. The wave S1 of FIG. 6S illustrates the output of the differentiation stage D1 between the instants TT1 and TT2 in response to the signature waveform Q1. It will be appreciated that the wave S1 represents the differential or the first time derivative of the wave Q1. Accordingly, the peak magnitude of the wave S between the instants TT1 and Ip is proportional to the maximum slope of the leading edge of the wave Q1 preceding occurrence of the first marked decrease of slope.

The voltage wave S1 is fed to the sample and hold stage SH1 to which the timing pulses produced at the output of the gate GG2 are also fed. The sample and hold stage SH1 is triggered by the timing pulses fed from the gate GG2 which occur at the instant I1 so that the voltage of the wave S1 is sampled at the instant I1 and stored until the next sensed vehicle produces a timing pulse. As the instant I1 coincides with the peak magnitude of the wave S1, the voltage stored at the output of the sample and hold stage SH1 is proportional to the maximum slope of the leading edge of the wave Q1 preceding the occurrence of the first marked decrease of slope and also represents the electrical quantity αt referred to earlier.

The voltage wave Q1 is also fed to the sample and hold stage SH2 to which the timing pulses produced at the output of the and gate GG1 are also fed. The timing pulses TPY from the gate GG1 trigger the stage SH2 to sample the voltage of the wave Q1 at the instant of first marked decrease of the slope (i.e. at the aforementioned instant Ip) and store the sampled voltage until the next sensed vehicle.

The respective output voltages of the sample and hold stage SH1 and SH2 are fed to the divider and scaler stage DS wherein the stored output voltage of the stage SH1 corresponding with the aforesaid electrical quantity αt is divided by the stored output voltage of the stage SH2 corresponding with the aforementioned electrical quantity Vp. The voltages produced at the output terminal S of the stage DS proportional to the speed of the last sensed vehicle.

The scaling factor of the stage DS is chosen to suit requirements.

Figure 7:
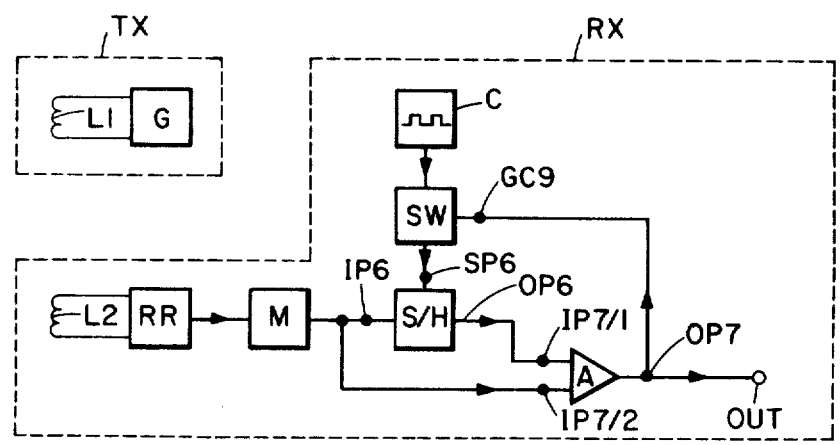
FIG. 7 is a detailed block schematic diagram of an identification system useable with the systems of FIGS. 1 and 5.

A representative one of the identification systems I disclosed in applicants co-pending Australian application PD0001 is illustrated in FIG. 7, along with the transmitting apparatus and associated parts of the receiving apparatus. The following description, incorporated from the Australian application, applies to use of the identification system in either embodiment.

The output signal produced by the demodulator M is simultaneously fed to one input IP7/2 of a comparator A and to the input IP6 of a sample and hold stage S/H, the output of which is fed to the other input IP7/1 of the comparator A. The output OP7 of the comparator A is connected to the output terminal OUT of the identification system, and also to the control terminal GC9 of a gate SW.

A free-running sampling pulse source C of known kind produces sampling pulses at periodically recurring instants, the sampling pulses having a duration of 5 microseconds, for example, and recurring at a pulse repetition frequency of 1 kilohertz, for example. The sampling pulses produced by the source C are fed via the gate SW to the sample and hold stage S/H.

Figure 8:
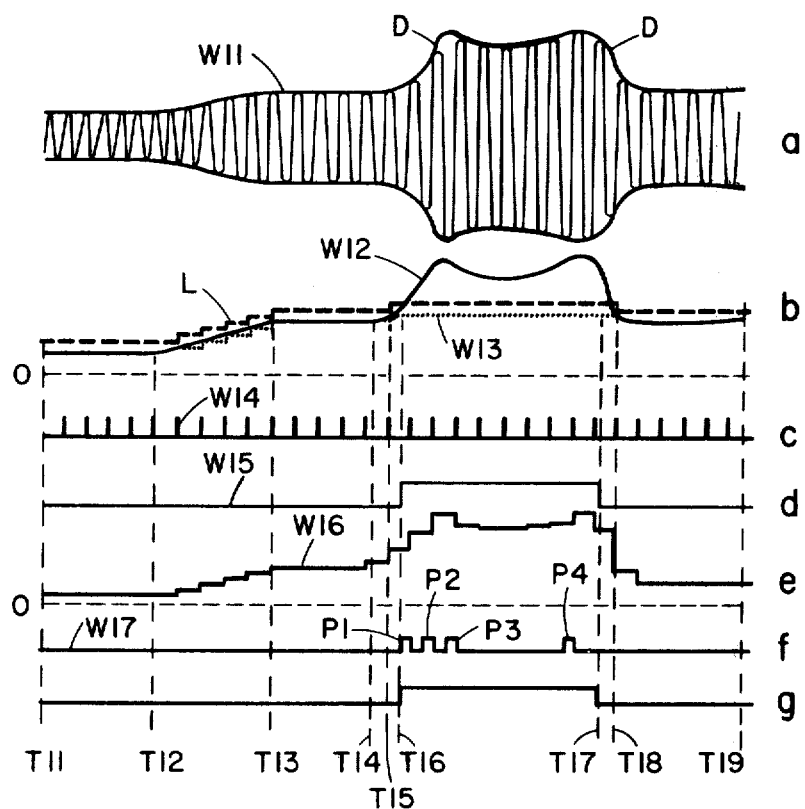
FIG. 8 illustrates diagrammatically waveforms produced at various parts of the identification system of FIG. 7.

The waveform W11 of FIG. 8(a) depicts, by way of example, a waveform of a signal at the output of the receiving stage RR. The waveform W12 (represented by a solid line) and the waveform W13 (represented by a dotted line, parts of which coincide with the solid line of waveform W12) in FIG. 8(b) respectively depict the resultant signal produced at the output of the demodulator stage M corresponding to the envelope of the waveform W11 and the resultant output waveform produced by the sample and hold stage S/H.

Between the instants T11 and T12 there is no vehicle within the zone of influence and the envelope level of the RF output signal is constant. Between the instants T12 and T13 there is a steady rise in the level of the envelope owing to a change of environmental conditions. Between the instants T13 and T14 the envelope level is constant once more. Between the instants T14 and T18 a vehicle is approaching and passing over the sensing means formed by the coils L1 and L2 and accordingly a positive going disturbance D of the envelope level is produced, the waveshape of the disturbance being determined by the characteristics of the passing vehicle. Between the instants T18 and T19 again there is no vehicle within the zone of the influence and the envelope level is constant.

It will be appreciated that the shape of the disturbance D to the envelope of the RF output signal W11 and also to the wave W12 between the instants T14 and T18 is the shape produced by the passage of a particular vehicle and that a different shape would be produced by a different vehicle. The shape of the envelope so formed can be referred to as the "signature waveform" of a vehicle. The length of time between the instants T14 and T18 is, of course, related to the length of the vehicle and to the speed of the vehicle in question.

The waveform W14 of FIG. 8(c) depicts the sampling pulse waveform produced by the source C and applied to the sample pulse input SP6 of the sample and hold stage S/H when the gate SW is open. The waveform W15 of FIG. 8(d) depicts the resultant waveform produced at the output terminal OUT.

Figure 9:
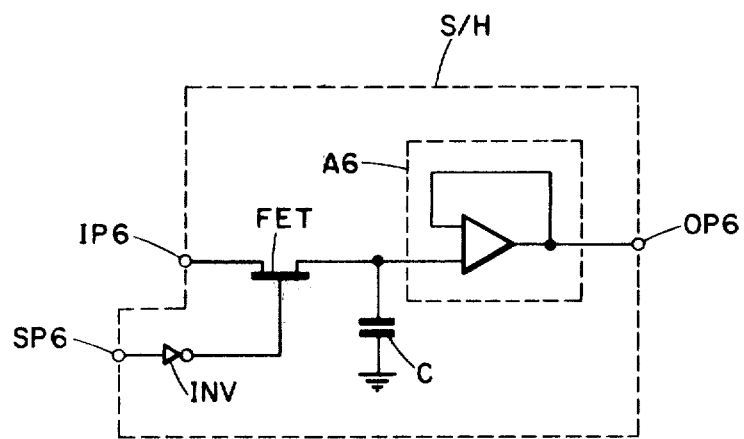
FIG. 9 is a detailed schematic diagram of a portion of the identification system of FIG. 7.

A more detailed schematic diagram of the sample and hold stage S/H is illustrated in FIG. 9. Positive going sampling pulses derived from the source C via the gate SW and as illustrated in FIG. 8(c) are applied to the sampling pulse input terminal SP6. Simultaneously, the output signal of the demodulation stage M corresponding with the envelope of the received signal and, by way of example, as illustrated by the waveform W12 in FIG. 8(b) is applied to the input terminal IP6. The positive going sampling pulses fed to the terminal SP6 are fed via the inverter INV to the gate electrode of the field effect transistor FET connected to function as a switch which is closed whenever a sampling pulse is present and is otherwise open so that each time the transistor FET is "closed", the capacitance C charges to a voltage corresponding to that of the input voltage present at the input terminal IP6 and holds the charge at the same voltage until the occurrence of the next succeeding sampling pulse, whereupon the process is repeated. The unity gain voltage follower A6 provides a high impedance across the capacitance C so that the charge across the capacitance C remains substantially constant between sampling pulses with the voltage produced at the output terminal OP6 coinciding with that present across the capacitance C. Thus, a stepwise voltage corresponding to that illustrated by waveform W13 of FIG. 8(b) is produced across the capacitance C and also at the output terminal OP6 in response to a received signal as depicted by the waveform W11 of FIG. 8(a) and it will be appreciated that while sample pulses are fed to the sample and hold stage S/H (for example between the instants T11 and T14) the waveform W13 is periodically brought to the same level as the waveform W12, being of constant amplitude between consecutive sampling pulse instants. Should supply of sample pulses to the terminal SP6 of the sample and hold stage S/H cease then the amplitude of the waveform W13 remains constant at the envelope level at the time of the last occurring sampling instant.

With a received signal as depicted by the waveform W11, the waveforms W13 and W12 are respectively supplied to the input IP7/1 and the input IP7/2 of the comparator A. The comparator A is a unidirectional comparator of known kind producing a logic "1" at the output terminal OP7 when the voltage applied to the input IP7/1 exceeds the voltage applied to the input IP7/2 by a fixed quantity being a characteristic of the unit employed (which in most instances would be an integrated circuit component of which several known kinds are appropriate), a logic "0" otherwise being produced at the output terminal OP7. The fixed quantity relating to the wave W13 can be denoted by a changing level and is denoted by the dotted line L in FIG. 8(b).

The gate SW is also of known kind and is such that with a logic "0" present at the control terminal GC9, the gate is open whereas a logic "1" present at the terminal GC9 closes the gate, terminating supply of sampling pulses from the source C to the sample and hold stage S/H.

Consider now the effect of the waveform W11 being received and the waveforms W12 and W13 consequently being produced at the inputs IP7/2 and IP7/1, respectively. As the amplitude of the waveforms W12 and W13 are the same between the instants T11 and T12, a logic "0" is produced at the output OP7 and the gate SW is open. During the period between the instants T12 and T13, the envelope level of the received signal rises slowly and prior to each sampling instant denoted by the respective sample pulses P of the waveform W14 the voltage of the wave W12 exceeds that of the wave W13. However, between the instants T12 and T13 the voltage difference between the waveforms W12 and W13 does not exceed the fixed quantity denoted by the line L and a logic "0" continues to be produced at the output terminal OP7 and hence at the output terminal OUT. Again, during the period between the instants T13 and T14 the amplitude of the waveforms W12 and W13 is the same and a logic "0" continues to be produced at the output terminal OP7.

Between the instants T14 and T15 there is a significant increase in the level of the waveform W12 owing to the disturbance D produced by the passage of a sensed vehicle. However, between the instants T14 and T15 the increase of voltage of the wave W12 relative to that of the waveform W13 again does not exceed the fixed quantity denoted by the line L so that the gate SW remains open and the sampling pulse P1 is fed to the sample and hold stage S/H sampling the envelope level at the instant T15 resulting in a corresponding increase of the level of the waveform W13.

Owing to the sharply rising leading edge of the disturbance D, at the instant T16, between the sampling instants of the sample pulses P1 and P2, the level of the waveform W12 exceeds that of the waveform W13 by the fixed quantity whereupon a logic "1" is produced at the output terminal OP7 simultaneously closing the gate SW so that the supply of sampling pulses to the sample and hold stage S/H ceases. Thus, the level of the waveform W13 remains at the envelope level present at the instant T15 and, as the level of the waveform W12 continues to exceed that of the waveform W13 by the fixed quantity until the instant T17, a logic "1" also continues to be produced at the output terminal OP7 until the instant T17 after which a logic "0" is produced. As the gate SW is opened by a logic "0" being present at the terminal OP7 then following the instant T17, the supply of sampling pulses to the sample and hold stage S/H recommences, the pulse P3 being the first sampling pulse generated subsequent to opening of the gate SW at the instant T17.

The present invention has been described loosely in terms of analogue techniques but lends itself particularly to the application of digital techniques throughout and the necessary modifications to achieve operation employing digital techniques will be apparent to persons skilled in the art.

The invention is by no means limited to the embodiments of the invention schematically described in relation to FIGS. 1-9 of the accompanying drawing. It will be clear to those skilled in the art that the "first peak" detected in the envelope voltage may not be a sharply defined peak, or the highest value of envelope voltage. It is sufficient if the slope of the leading edge reduce to a markedly lower value or changes sign. Other embodiments and variations employing the principles of the invention will be evident to persons skilled in the art. Such embodiments and variations are intended to be included within the scope of the present invention.

What is claimed is:

1. A vehicle detection system comprising a transmitter for supplying a continuous wave signal, a receiver and sensing means for coupling said continuous wave signal to said receiver so that the approach of a vehicle produces a disturbance having a leading edge with a changing voltage level in the envelope of the signal received by said receiver, said envelope rising to at least a first peak level, said receiver including:
   first means for deriving from said received signal a first signal representative of the maximum slope of said leading edge of said disturbance at a first instant preceding the occurrence of said first peak,
   peak detecting means for deriving from the received signal a peak signal representative of the first peak of the envelope voltage during the leading edge portion of said disturbance less the envelope voltage prior to said disturbance, and
   means for producing from said first and peak signals a signal representative of the ratio between said first and peak signals which is proportional to the velocity of the vehicle.

2. A system according to claim 1 wherein said first deriving means includes means for differentiating the envelope voltage of said received signal to thereby generate a differential signal corresponding to the differential of the envelope, and means coupled to said differentiating means for detecting a peak in said differential signal and thereupon generating a first timing signal corresponding to the first instant, for sampling the voltage of the envelope upon occurrence of said first timing signal; said peak detecting means includes means coupled to said differentiating means for detecting a zero crossover of said differential signal and thereupon generating a peak timing signal at said first peak; and said first deriving means further includes means responsive to said first timing signal for sampling the envelope voltage upon occurrence of said first timing signal.

3. A system as claimed in claim 1 or claim 2 wherein said means for producing comprises means for dividing said first signal by said peak signal to produce said velocity-proportional signal.

4. A system according to claim 1 wherein said receiver includes means for differentiating twice the envelope of said received signal to obtain thereby a double differential signal corresponding to the second differential of the envelope, said first means comprising means coupled to said twice differentiating means for detecting the first zero crossover point of the double differential signal, which point corresponds to said first instant.

5. A system as claimed in claim 4 wherein said peak detecting means comprises means for differentiating three times the envelope of said received signal to obtain a triple differential signal corresponding to the third differential of the envelope voltage, and means coupled to said three times differentiating means for detecting a zero crossover point of the triple differential signal which corresponds to said peak instant.

* * * * *